Feb. 24, 1953 K. R. HENRY 2,629,680
FUEL TANK PANEL
Filed Sept. 21, 1948
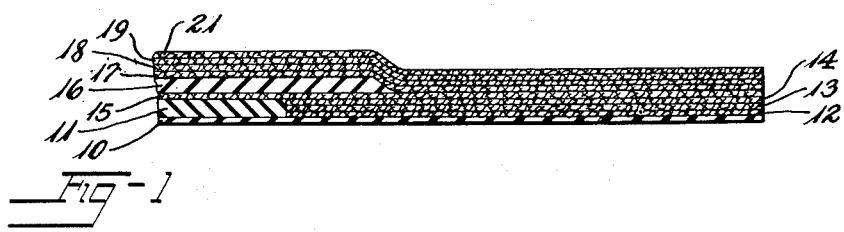
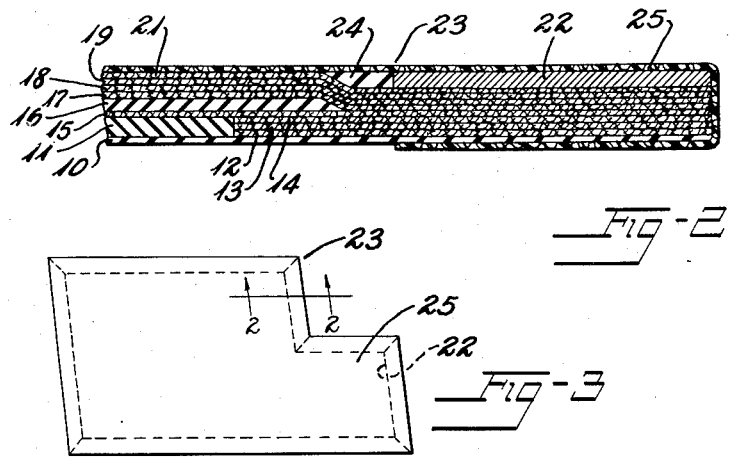
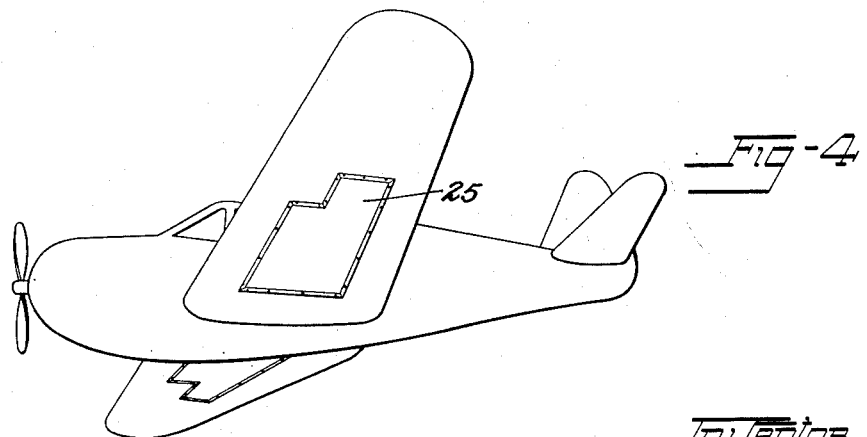
Inventor
Karl R. Henry
By Robert W. Furlong
Atty Patented Feb. 24, 1953

2,629,680

UNITED STATES PATENT OFFICE 2,629,680

FUEL TANK PANEL

Karl R. Henry, Stow, Ohio, assignor to The B. F. Goodrich Company, New York, N. Y., a corporation of New York Application September 21, 1948, Serial No. 50,391

4 Claims. (Cl. 154—118)

This invention relates to fuel cell panels and a method of making the same, and particularly to self-sealing panels suitable for placing over the surfaces of fuel tanks in aircraft.

It is an object of this invention to provide fuel cell panels which may be used to cover any or all of the surfaces of a fuel tank. It is a further object to provide fuel cell panels which have an outer surface suitable for serving as an aerodynamic surface of an aircraft wing. It is also an object to provide a simple method for making self-sealing panels to an exact size. Other objects will be apparent from the description which follows.

Heretofore self-sealing fuel cells have been constructed of rubber and fabric in such a manner that the cell was in one piece when completed. These one-piece fuel cells were satisfactory in the aircraft of yesterday but with the increased size of aircraft and of fuel cells, the cells became very difficult to install and tended to sag even when carefully suspended in cradles. Therefore, fuel cell panels of a composite textile fabric and rubber or resin construction have been constructed to be placed over the outer surfaces of the fuel tanks. The fuel cell panels must be built to exact size when they are used to cover portions of the aircraft wing, for instance, when used to serve as the lower aerodynamic surface of the wing. Close tolerances on the length and width of the panels have been difficult to meet because of the tendency of the fabric element to shrink erratically during vulcanization or heat treatment of the rubber or resin used to bind the fabric reinforcement together. Cutting the panels to size after completion of the heat treatment leaves exposed raw edges on the panel.

The present invention overcomes these difficulties and makes possible the construction of wall panels with close dimensional tolerances, while at the same time providing the smooth outer surface required for aerodynamic surfaces and sealing the edges of the panel to prevent undesirable absorption of water vapor or other foreign material by the fabric element while the panel is in use.

One embodiment of my invention is shown in the accompanying drawings, in which,

Fig. 1 is a cross-sectional view of a panel in an intermediate stage of construction;

Fig. 2 is a cross-sectional view of the finished panel taken along line 2—2 of Fig. 3;

Fig. 3 is a plan view of the finished panel; and

Fig. 4 is a perspective view of a portion of an aircraft wing with a completed panel in place.

Referring to Fig. 1 the inner gasoline-resistant lining 10 of butadiene-acrylonitrile synthetic rubber is adhered to a butadiene-styrene synthetic rubber sealant ply 11. The sealant ply 11 extends substantially the width and length of the panel, but is replaced at the borders of the panel by three nylon fabric plies 12, 13, and 14 which abut the sealant ply 11 and then extend to the untrimmed edge of the panel. Next above the sealant ply 11 is a nylon fabric ply 15 which extends beyond sealant ply 11 and to the untrimmed edge of the panel. Next to the nylon fabric ply 15 is another butadiene-styrene synthetic rubber sealant ply 16 which is but slightly wider than sealant ply 11. Next to the sealant ply 16 are four plies of nylon fabric 17, 18, 19 and 21, which are folded down over the edge of sealant ply 16 and adhered to the face of underlying fabric ply 15. All of the various layers are firmly adhered together with a suitable adhesive. The fabric plies may be coated or impregnated with a heat-curable binder or adhesive composition such as a vulcanizable rubber, a thermosetting resin e. g. phenol-aldehyde or urea-formaldehyde or other suitable adhesive or binder composition. After assembly of the structure as shown in Fig. 1, the whole structure is heated for 1 to 5 hours in dry air at from 175° to 300° F. to effect vulcanization or cure of the vulcanizable and thermosetting components.

As shown in Fig. 2 the eight nylon fabric plies 12, 13, 14, 15, 17, 18, 19, and 21 and the butadiene-acrylonitrile synthetic rubber inner ply 10 have been trimmed to the correct size after the assembly has been heated. Fuel cell panels made in such a manner allow maintenance of overall dimensions within very close tolerances. Although the nylon fabric plies shrink erratically when the semi-finished panel shown in Fig. 1 is heated to effect vulcanization of the rubber plies, the panel may be made to exact size by trimming the nylon and rubber liner plies at the border of the panel after vulcanization. After trimming to size, the metallic reinforcing strip 22 is cemented along the border of the panel 23 to the nylon fabric ply 21. The juncture between the metallic border strip 22 and the bend in nylon fabric ply 21 is filled with a strip 24 of vulcanized butadiene-styrene synthetic rubber, which is cemented into place. A coated fabric ply 25 coated with plasticized polyvinyl chloride covers the entire outer face of the panel and extends around the edges of the panel and over the border of the opposite side. This cover is cemented to the panel at all points of contact, rolled down, and dried at room temperature. The plasticized polyvinyl-chloridecovered fabric ply provides a smooth finish suitable for an aerodynamic surface and one which is resistant to water, oil, gasoline, acid, alcohol, and other rubber-damaging elements around aircraft.

The construction shown here provides a self-sealing fuel cell panel which has adequate border strength and is suitable for attachment by screws passing through metal strip 22 or other fastening means to sections of a metal fuel cell or sections of an aircraft wing which make up the fuel tank. The thickness of the panel may vary and likewise the ply thicknesses may be changed. In one application of this method of construction the nylon fabric plies were .030" thick, the sealant plies were .093" thick, the rubber inner ply was .020" thick, the aluminum border strip was .091" thick, and the plasticized polyvinyl-chloride covered-ply was .030" thick. The total thickness of the panel was thus about .4". This thickness was found adequate to provide the necessary sealant properties and also the necessary body strength for panels from one to 145 inches in length.

These panels are easily installed on the sides of a metal fuel cell or on sections of an aircraft structure which make up the fuel tank. Fig. 4 shows a panel mounted on the lower aerodynamic surface of an aircraft wing. The panel is held in place by screws which pass through the metallic border strips of the panel into drilled and tapped holes in the wing structure. The panels lie next to the metallic skin of the wing and the edges of the panel are covered with fairing tape.

Although the description of an aircraft self-sealing panel has been outlined, it must be understood that the shelf-sealing panel may be used on any fuel cell and not just those of aircraft. Also it should be evident that panels of various sizes and shapes may be made by the methods of this invention. In addition, the invention is not limited to the materials used in the specific example. The inner gasoline resistant ply may be any material which is resistant to petroleum products, such as metal foil, polyethylene, polysulfide, superpolyamides, plasticized polyvinyl alcohol, plasticized polyvinyl chloride, chloroprene, or a rubbery copolymer of butadiene and acrylonitrile, the latter being preferable. The fabric to reinforce the construction may be cotton, rayon, nylon or any other fibers which will give the necessary properties of high strength and high stretch, nylon being preferable because it has these properties. The outer ply may be any material which is resistant to the rubber and fabric damaging elements which are normally prevalent around aircraft and motor vehicles. The materials suitable for the outer ply are the same as those listed for the inner gasoline-resistant ply, and a cloth reinforced polyvinyl chloride sheet is the preferred material. The sealant plies must be one of those compositions which will swell but will not dissolve when in contact with petroleum products, such as aircraft fuels. These plies may be soft vulcanized rubber, or the preferred butadiene-styrene American made rubber used in the specific example, or any other suitable material or materials.

The number of fabric and rubber plies may also be changed without deviating from the scope of this invention. The plies of rubber and fabric may be adhered one to the other by any suitable method, but this invention pertains particularly to the method of building panels to an exact size and attaching reinforcing border strips as described herein.

Although I have herein disclosed specific embodiments of my invention, I do not intend to limit myself solely thereto, but to include all of the obvious variations and modifications falling within the spirit and scope of the accompanying claims.

I claim:

1. A method of making an accurately dimensioned self-sealing fuel cell panel from heat-shrinkable materials comprising the steps of adhesively assembling together a plurality of plies of heat-shrinkable nylon fabric and butadiene-styrene synthetic rubber, said fabric plies extending beyond said butadiene-styrene rubber plies to form marginal zones of reduced thickness, adhering a liner of butadiene-acrylonitrile synthetic rubber composition to one face of said assembly, heating the product to shrink said fabric and vulcanize said butadiene-styrene and butadiene-acrylonitrile rubber, cutting off a portion of said marginal zones to provide a preshrunk accurately dimensioned vulcanized member, adhering a metallic reinforcing strip along said cut edges at the face of said member opposite said liner, said reinforcing strip lying wholly beyond the margins of said butadiene-styrene rubber plies and being substantially equal in thickness thereto, and then adhering a smooth thermoplastic cover ply over the face of said member opposite said liner, and over said metallic strip, said cover ply extending around the cut edges of said member.

2. A detachable fuel-impervious and puncture-sealing panel comprising an inner base layer of gasoline-impervious material, a relatively stiff reinforcing and attaching strip extending peripherally about the margin of said panel in united relation thereto, a plurality of superimposed outer layers of relatively strong textile fabric material overlying said base layer with marginal portions extending across said strip and presenting exposed edges, rubbery puncture-sealant material within the area of said panel bounded by said strip, and a continuous protective cover of fluid-impervious rubbery material united with and overlying said fabric layers at the outer face of the panel and extending across said strip to the marginal edge of the panel and continuing across said marginal edge including said exposed edges of the fabric layers in united contacting relation therewith to seal the same, said puncture-sealant material being disposed between said base layer and said protective cover in a manner to present, throughout said area of the panel bounded by said strip, uninterrupted sealant protection in planes normal to the plane of said panel.

3. A detachable fuel-impervious and puncture-sealing panel comprising an inner base layer of gasoline-impervious rubbery material, a continuous layer of rubbery puncture-sealant material superimposed on said base layer in united relation thereto with the periphery of the puncture-sealant layer inwardly spaced from the periphery of said base layer, a plurality of superimposed outer layers of relatively strong textile fabric material overlying said puncture-sealant layer in united relation thereto and to one another with marginal portions extending beyond said periphery of said puncture-sealant layer to said periphery of said base layer and presenting exposed edges, a relatively stiff reinforcing and attaching strip extending peripherally about the panel at said marginal portions in superimposed united relation thereto and occupying substantially the entire area thereof with the inner peripheral edge of said strip spaced from said periphery of said puncture-sealant layer, a filler element of rubbery puncture-sealant material extending away from said inner peripheral edge to at least the position of said periphery of said puncture-sealant layer so that said rubbery material of said filler element together with that of said puncture-sealant layer provides uninterrupted sealant protection throughout the area of the panel bounded by said strip and in planes normal to the plane of said panel, and a smooth-surfaced continuous protective cover of fluid-impervious rubbery material superimposed on said fabric layers and on said strip in united relation thereto and extending across the peripheral edge of said strip and said exposed edges of the fabric layers and the peripheral edge of said base layer in united contacting relation therewith to seal the same.

4. A detachable fuel-impervious and puncture-sealing panel comprising an inner base layer of rubbery butadiene-acrylonitrile copolymer material impervious to gasoline, a pair of superimposed continuous puncture-sealant layers of butadiene-styrene synthetic rubber material separated by a layer of nylon fabric material therebetween and disposed overlying said base layer in adhered relation thereto and to one another with the peripheries of both puncture-sealant layers inwardly spaced from a periphery common to said base layer and to the fabric layer, a plurality of superimposed outer layers of nylon fabric material overlying the pair of puncture-sealant layers and the first said fabric layer in adhered relation thereto and to one another with marginal portions extending beyond said peripheries of both puncture-sealant layers to the common periphery of said base layer and the first said fabric layer, all the fabric layers presenting exposed peripheral edges, a metallic relatively stiff reinforcing and attaching strip extending peripherally about the panel at said marginal portions in superimposed adhered relation thereto and occupying substantially the entire area thereof with the inner peripheral edge of said strip spaced from said peripheries of both puncture-sealant layers, a filler element of butadiene-styrene synthetic rubber material extending away from said inner edge of said strip to at least the position of the periphery of one puncture-sealant layer so that said synthetic rubber material of both puncture-sealant layers together with that of said filler element presents uninterrupted sealant protection throughout the area of the panel bounded by said strip and in planes normal to the plane of said panel, and a smooth-surfaced continuous protective cover of fluid-impervious fabric-reinforced rubbery material superimposed on said plurality of nylon fabric outer layers and on said strip in adhered relation thereto and extending across the outer peripheral edge of said strip and said exposed peripheral edges of the fabric layers and the peripheral edge of said base layer in adhered contacting relation therewith to seal the same.

KARL R. HENRY.

REFERENCES CITED

The following references are of record in the file of this patent:

UNITED STATES PATENTS

| Number | Name | Date |
|---|---|---|
| 1,819,147 | Bronson | Aug. 18, 1931 |
| 1,838,102 | McGovern | Dec. 29, 1931 |
| 2,122,246 | Clewell | June 28, 1938 |
| 2,134,496 | Zinser | Oct. 25, 1938 |
| 2,202,977 | Woodall | June 4, 1940 |
| 2,340,208 | Skolnik | Jan. 25, 1944 |
| 2,411,116 | Sanz | Nov. 12, 1946 |
| 2,417,175 | Raffles | Mar. 11, 1947 |
| 2,429,688 | Hoover | Oct. 28, 1947 |
| 2,439,562 | Cunningham | Apr. 13, 1948 |
| 2,440,965 | Merrill | May 4, 1948 |
| 2,446,815 | Davies et al. | Aug. 10, 1948 |
| 2,484,141 | Alex | Oct. 11, 1949 |
| 2,511,168 | Martin et al. | June 13, 1950 |